(12) United States Patent
Dimsdale

(10) Patent No.: US 7,453,553 B2
(45) Date of Patent: Nov. 18, 2008

(54) SYSTEM AND METHOD FOR DETERMINING RANGE IN 3D IMAGING SYSTEMS

(75) Inventor: Jerry Dimsdale, Oakland, CA (US)

(73) Assignee: Dimsdale Engineering, LLC, Oakland, CA (US)

( * ) Notice: Subject to any disclaimer, the term of this patent is extended or adjusted under 35 U.S.C. 154(b) by 0 days.

(21) Appl. No.: 11/691,256

(22) Filed: Mar. 26, 2007

(65) Prior Publication Data

US 2007/0252974 A1    Nov. 1, 2007

Related U.S. Application Data

(62) Division of application No. 10/886,073, filed on Jul. 6, 2004, now Pat. No. 7,236,235.

(51) Int. Cl.
*G01C 3/08* (2006.01)
(52) U.S. Cl. ...................................... 356/5.1
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 3,983,481 A | | 9/1976 | Nutt et al. |
| 4,620,788 A | * | 11/1986 | Giger ......................... 356/5.13 |
| 5,446,529 A | | 8/1995 | Stettner et al. |
| 5,453,840 A | * | 9/1995 | Parker et al. ................. 356/400 |
| 5,892,575 A | | 4/1999 | Marino |
| 5,988,862 A | | 11/1999 | Kacyra et al. |
| 6,094,215 A | | 7/2000 | Sundahl et al. |
| 6,133,989 A | | 10/2000 | Stettner et al. |
| 6,176,837 B1 | | 1/2001 | Foxlin |

(Continued)

FOREIGN PATENT DOCUMENTS

DE        4109844        6/1992

(Continued)

OTHER PUBLICATIONS

"Invitation to Pay Additional Fees, for Application No. PCT/US2005/023922, date mailed Nov. 7, 2005", 8 Pages.

(Continued)

*Primary Examiner*—Thomas H. Tarcza
*Assistant Examiner*—Luke D Ratcliffe
(74) *Attorney, Agent, or Firm*—Schwegman, Lundberg & Woessner, P.A.

(57) ABSTRACT

A system and method of imaging an object. An array of detectors is mounted in an image plane. Each detector in the array of detectors is connected to a timing circuit having an interpolator, wherein the interpolator includes a first circuit which charges a first capacitor at a different rate than it discharges. An optical pulse is transmitted toward an object so that a portion of the optical pulse is reflected from the object as a reflected pulse and a first value representative of when the optical pulse was transmitted toward the object is recorded. The reflected pulse is detected at one or more detectors and a pulse characteristic of the pulse and a second value representative of when the reflected pulse arrived at the detector are recorded. Range to the object is then calculated as a function of the first and second values and the reflected pulse characteristic.

20 Claims, 10 Drawing Sheets

U.S. PATENT DOCUMENTS

| | | |
|---|---|---|
| 6,195,122 B1 | 2/2001 | Vincent |
| 6,246,468 B1 | 6/2001 | Dimsdale |
| 6,323,942 B1 | 11/2001 | Bamji |
| 6,330,523 B1 | 12/2001 | Kacyra et al. |
| 6,359,681 B1 | 3/2002 | Housand et al. |
| 6,373,557 B1 | 4/2002 | Mengel et al. |
| 6,414,746 B1 | 7/2002 | Stettner et al. |
| 6,420,698 B1 | 7/2002 | Dimsdale et al. |
| 6,426,468 B1 | 7/2002 | Utsunomiya et al. |
| 6,448,572 B1 | 9/2002 | Tennant et al. |
| 6,473,079 B1 | 10/2002 | Kacyra et al. |
| 6,512,518 B2 | 1/2003 | Dimsdale |
| 6,512,993 B2 | 1/2003 | Kacyra et al. |
| 6,522,395 B1 | 2/2003 | Bamji et al. |
| 6,535,275 B2 | 3/2003 | McCaffrey et al. |
| 6,583,863 B1 | 6/2003 | Smith |
| 6,619,406 B1 | 9/2003 | Kacyra et al. |
| 6,664,529 B2 | 12/2003 | Pack et al. |
| 6,734,849 B2 | 5/2004 | Dimsdale et al. |
| 7,236,235 B2 | 6/2007 | Dimsdale |
| 2003/0202089 A1 | 10/2003 | Alhadef et al. |
| 2004/0085526 A1 | 5/2004 | Gogolla et al. |
| 2006/0006309 A1 | 1/2006 | Dimsdale et al. |
| 2006/0007422 A1 | 1/2006 | Dimsdale |

FOREIGN PATENT DOCUMENTS

| | | |
|---|---|---|
| EP | 1291673 A2 | 3/2003 |
| GB | 2292605 | 2/1996 |
| WO | WO-9740342 A2 | 10/1997 |
| WO | WO-03062849 A2 | 7/2003 |
| WO | WO-2006014445 A1 | 2/2006 |
| WO | WO-2006014470 A2 | 2/2006 |
| WO | WO-2006014470 A3 | 2/2006 |

OTHER PUBLICATIONS

Kalisz, Josef , et al., "Error Analysis and Design of the Nutt Time-interval Digitiser with Picosecond Resolution", *J. Phys. E.: Sci. Instrum.*, 20, (Nov. 1987), 1330-1341.

Kalisz, Josef , "Review of methods for time interval measurements with picosecond resolution", *Metrologia*, 41, (2004), 17-32.

Leskovar, B , et al., "Optical timing receiver for the NASA spaceborne ranging system", *Lawrence Berkeley Laboratory Report, LBL* 8129, (1978), 1-62.

Marino, R M., "3D imaging laser radar with photonic sensitivity", *Proc. IRIS Systems*, (May 1996), 2-9.

Porat, D , "Review of Sub-Nanosecond Time-Interval Measurements", *IEEE Transactions on Nuclear Science*, vol. NS-20, No. 5, (Oct. 1973), 36-42.

Turko, B , "A Picosecond Resolution Time Digitizer for Laser Ranging", *IEEE Transactions on Nuclear Science*, vol. NS-25, No. 1, (Feb. 1978), 75-80.

"U.S. Appl. No. 10/886,079, Non-Final Office Action mailed Dec. 27, 2007", OARN, 25 pgs.

* cited by examiner

SYSTEM AND METHOD FOR DETERMINING RANGE IN 3D IMAGING SYSTEMS

CROSS-REFERENCE TO RELATED APPLICATION

This application is a divisional of U.S. application Ser. No. 10/886,073 now U.S. Pat. No. 7,236,235, filed on Jul. 6, 2004 entitled "System and Method for Determining Range In 3D Imaging Systems," which is related to U.S. patent application Ser. No. 10/886,079, filed on Jul. 6, 2004 entitled "System and Method for 3D Imaging," the entire contents of both applications are incorporated herein by reference.

BACKGROUND OF THE INVENTION

1. Field of the Invention

This invention relates to imaging of objects using arrays of light detectors and, more particularly, to a system and method for determining range in three-dimensional imaging systems.

2. Background Information

Laser techniques, such as LADAR (Laser Detection and Ranging) or "LIDAR" (Light Detection and Ranging), are currently being used to image objects in three-dimensional image systems. Light, often from a laser source, is directed toward an object of interest. Reflected light from the object is then gathered and focused on one or more photodetectors.

LADAR systems are capable of determining the distance to an object, for example, by timing the travel time of light pulses sent round trip from a source to the object and back to a detector. However, adapting such systems to image remote objects challenges the sensitivity and speed of available devices.

Stettner et al, in U.S. Pat. No. 5,446,529 (1995), describes an array of detectors placed at the image plane to detect a two-dimensional image frame, which can be further processed to enhance the image. If adequate light is gathered and the reflective emissions of the object are distinguishable from noise, an object can be identified by such a system.

In some laser imaging systems either the scanner or the receiver is scanned across the object, and multiple laser pulses are used to probe the contours of the object. An example of such an approach is shown in U.S. Pat. No. 6,734,849, issued to Dimsdale et al. on May 11, 2004.

In U.S. Pat. No. 5,892,575 (1999), Marino, on the other hand, discloses a system for imaging a scene using an array of monolithic light detectors operating in non-linear Geiger mode. In one "scanner-less" embodiment disclosed by the patent, a processor develops an image of the target scene based on the round trip travel times of object-reflected photons received by a photodetector array at multiple positions on the array.

The approaches to date have been complex and, therefore, expensive to produce and maintain. What is needed is a system and method for imaging which addresses the above issues and other issues that will become evident when reading the description below.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
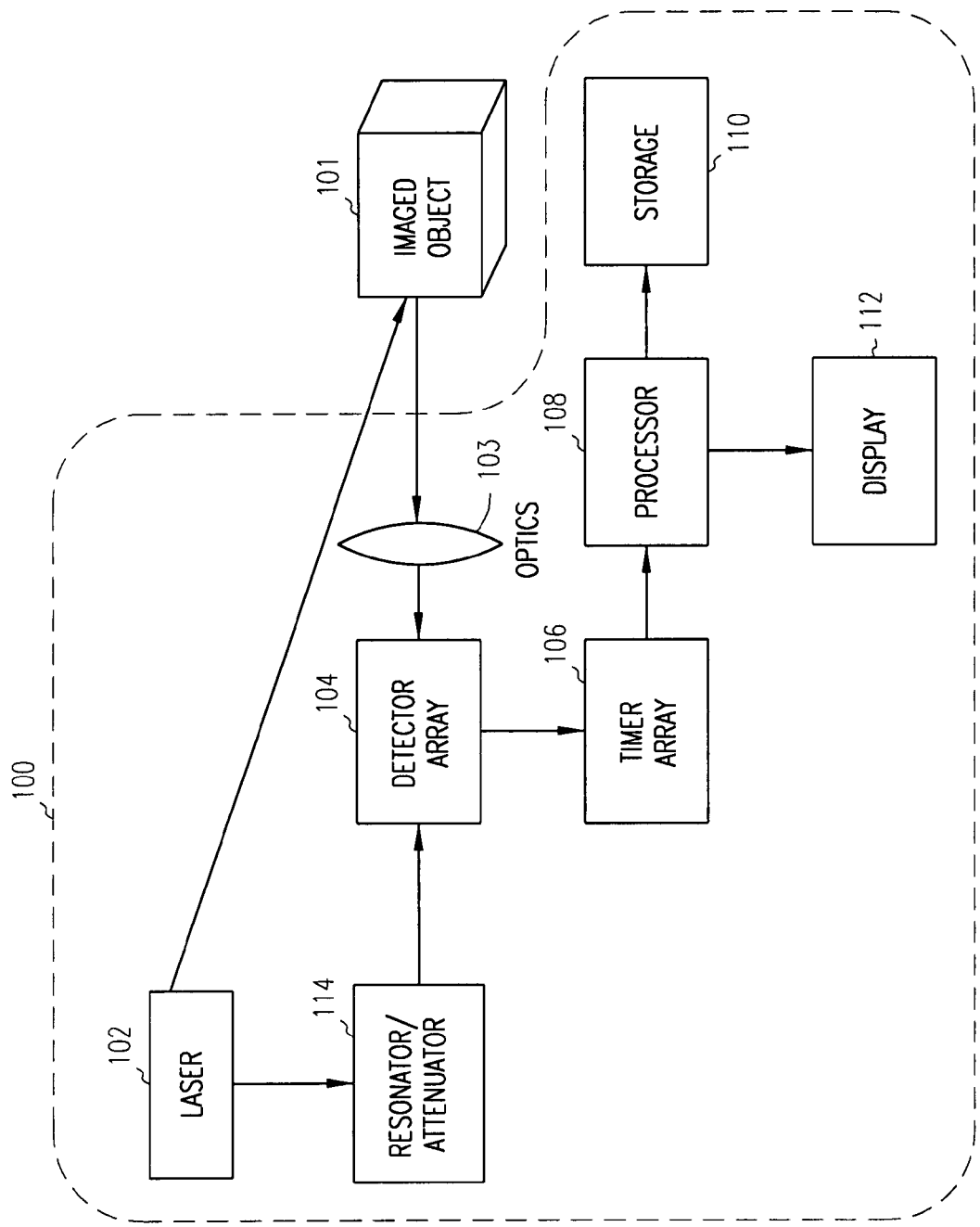
FIG. 1 illustrates an imaging system according to the present invention.

A representative system 100 for creating a high resolution three-dimensional image of a scene of interest 101 is shown in FIG. 1. A pulsed light source 102, typically a laser, is directed toward target scene 101. Some of the light is reflected back from the scene. An array of detectors 104 receives the light from portions of the scene. The distance from the system to the portion of the scene 101 in the field of view of a single detector is determined by the time required for the light to illuminate that portion and then return to the detectors 104.

In the embodiment shown in FIG. 1, imaging system 100 includes a laser 102, optics 103, a detector array 104, a timer circuit 106, a processor 108, storage 110 and a display 112. In one embodiment (such as is shown in FIG. 1), system 100 also includes a resonator/attenuator 114 used to calibrate system 100 in a manner to be described below. System 100 measures the round trip time for reflected laser pulse from one or more targets for each of a two-dimensional array of pixels, providing an image with millimeter range accuracy and resolution.

Figure 2:
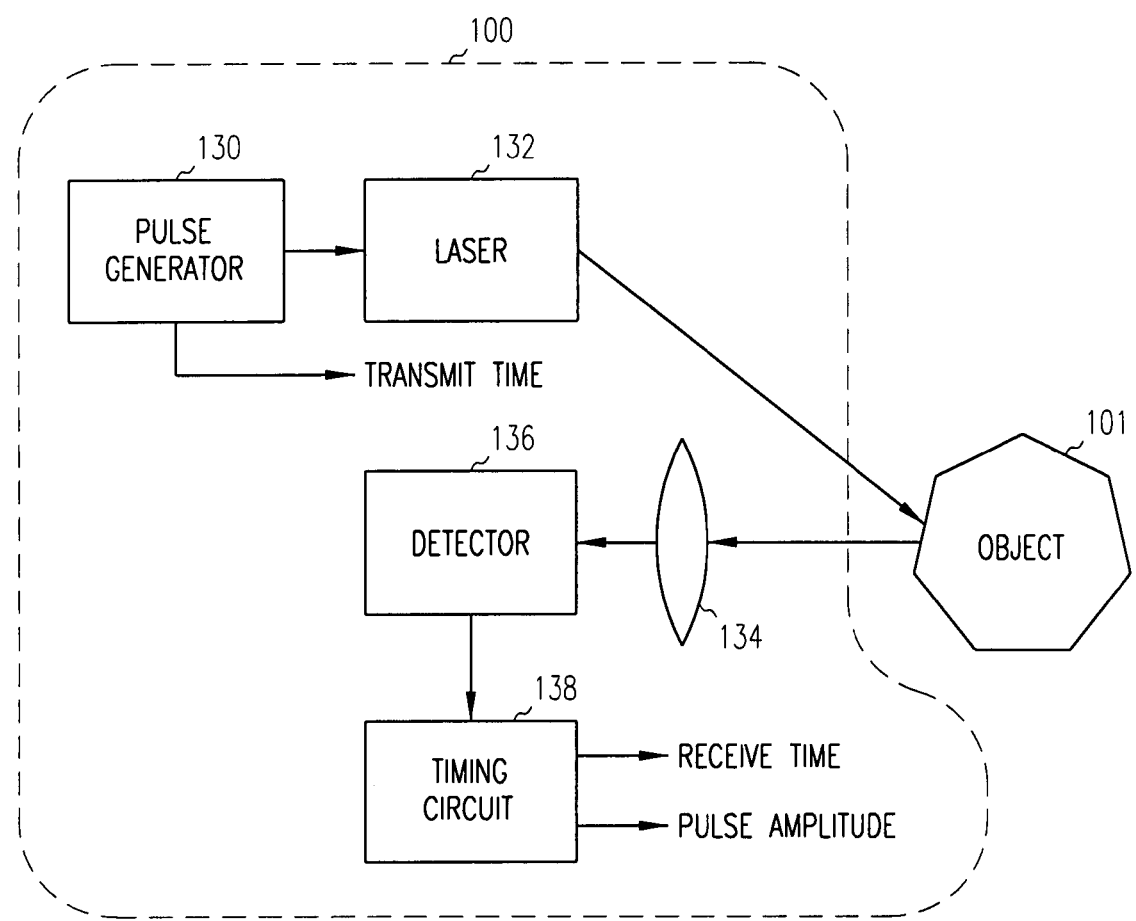
FIGS. 2-4 illustrate other embodiments of an imaging system.

In one embodiment, such as is shown in FIG. 2, system 100 includes a pulse generator 130 connected to a laser 132. The pulse generator 130 issues an electrical pulse which is turned into an optical pulse by laser 132. If the time from generation of the electrical pulse to the optical pulse is repeatable, transmit time can be determined from generation of the electrical pulse by pulse generator 130. If not, transmit time can be determined based on generation of the optical pulse by laser 132.

System 100 measures the round trip time for reflected laser pulse from one or more targets for each of a one or two-dimensional array of pixels, providing an image with millimeter range accuracy and resolution. In the embodiments shown in FIG. 2, optics 134 and detector 136 receive light reflected from object 101. Each detector 136 is connected to a timing circuit 138. In one embodiment, each timing circuit 138 includes a plurality of interpolators.

An optical pulse is transmitted toward object 101 so that a portion of the optical pulse is reflected from the object as a reflected pulse. The reflected pulse passes through optics 134 and falls on detector 136. The time for the optical pulse to bounce off object 101 and arrive at one or more of the detectors 136 is used to determine range to object 101. In one embodiment, detecting arrival of the reflected pulse includes integrating the reflected pulse over a predetermined interval of time to determine a reflected pulse characteristic and recording a value representative of when the reflected pulse arrived at detector 136. Range is then calculated as a function of the transmit time, the receive time and the reflected pulse characteristic.

Figure 3:
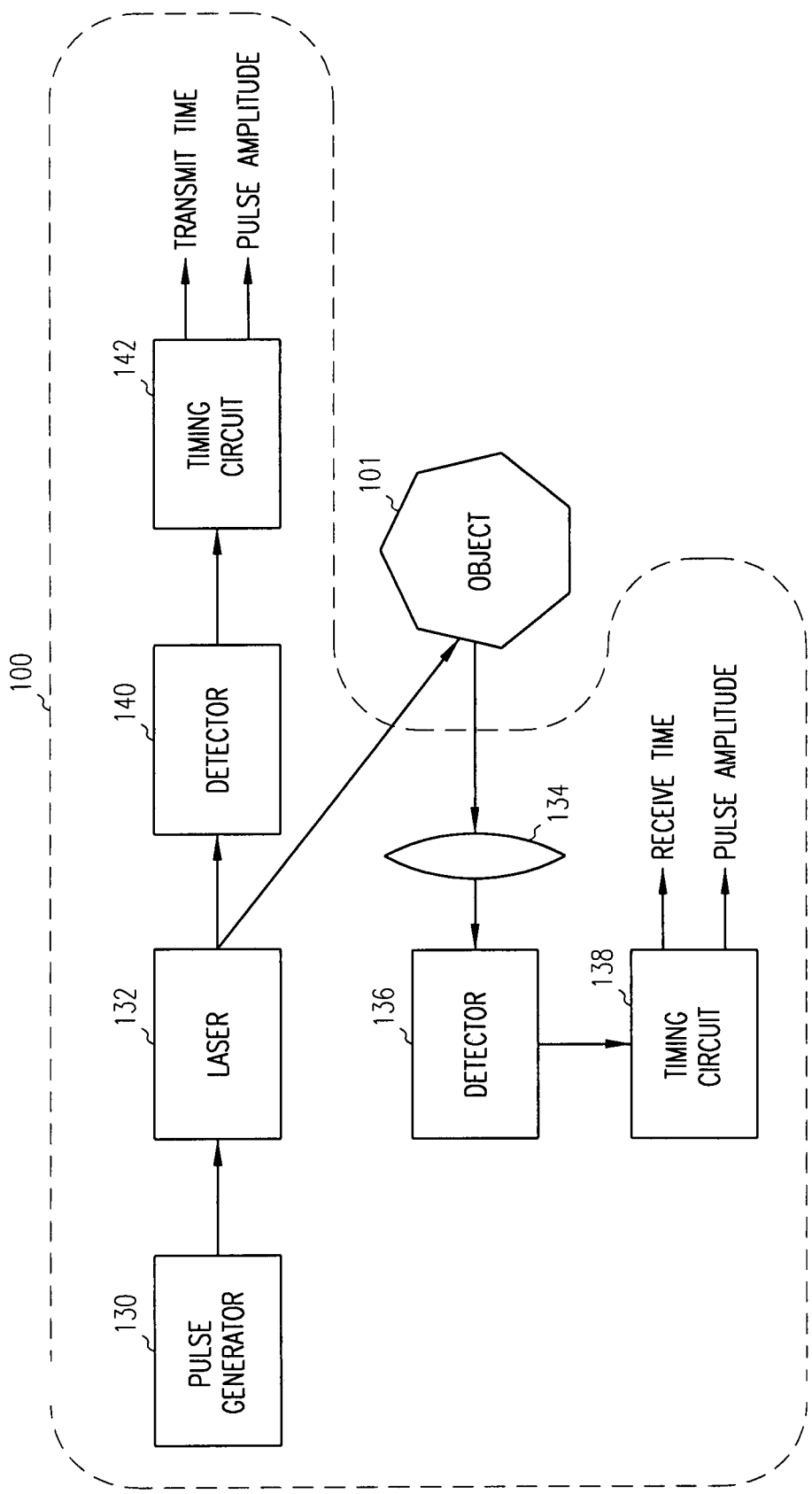

As noted above, there often-times is an undeterminable lag between stimulation of laser 132 with an electrical pulse and issuance of an optical pulse by laser 132. In such instances, transmit time must be calculated from issuance of the optical pulse. In one embodiment, system 100 includes a detector 140 and a timing circuit 142 which can be used to determine transmit time for the optical pulse. One such embodiment is shown in FIG. 3.

Figure 4:
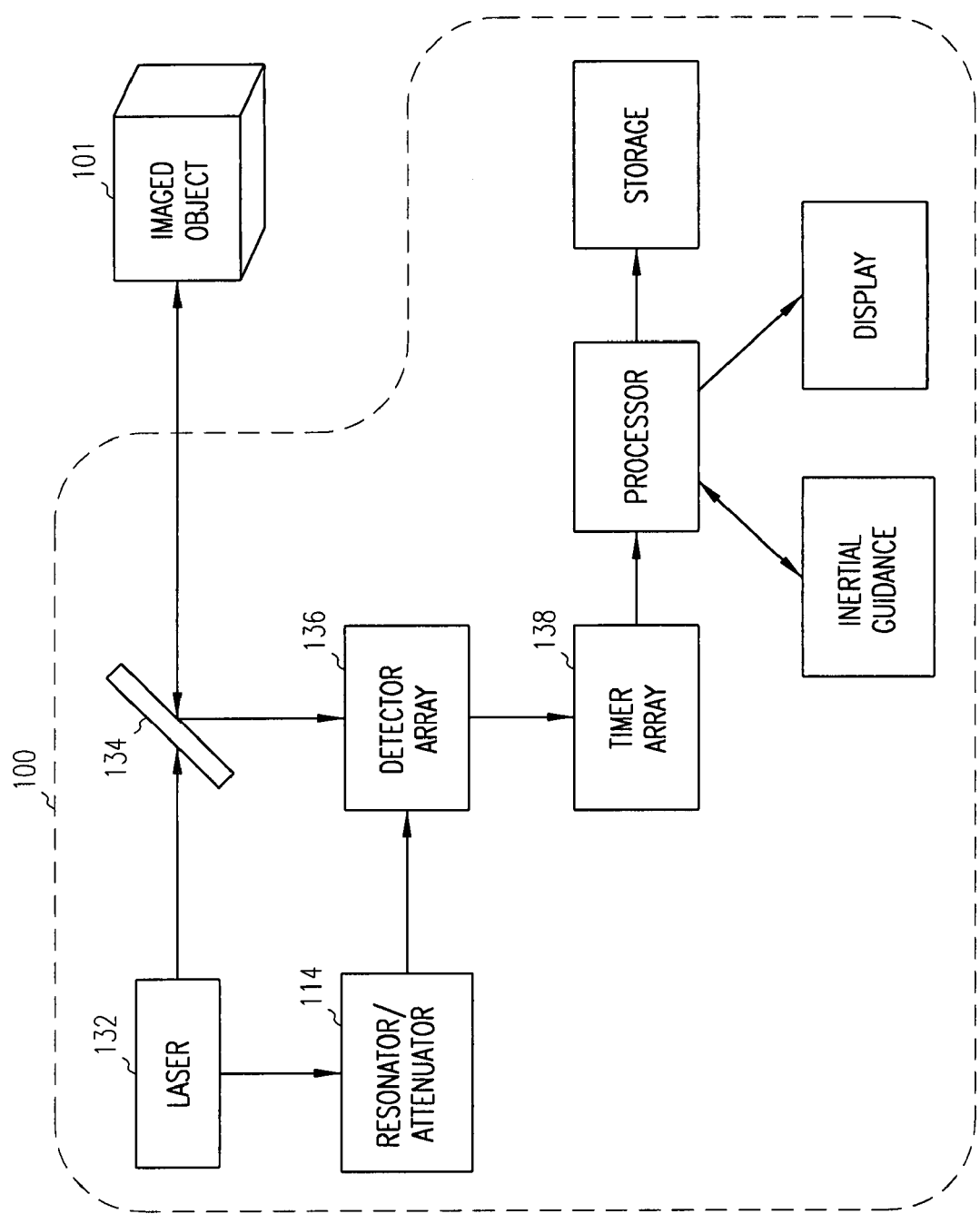

In another embodiment, such as is shown FIG. 4, a portion of the optical pulse is directed to detectors 136. That portion uses detectors 136 and timing circuits 138 to determine a transmit time and amplitude for the optical pulse.

In one embodiment, detector array 104 and timer array 106 are implemented as a hybrid of two chips, an array of detectors connected to an array of processing electronics unit cells. Each detector on one chip is connected to its own processing-electronics unit cell on the other chip. This defines one voxel in the image. Each processing-electronics unit cell on the array contains an identical and unique integrated circuit which can store one or more reflected-pulse transit times and either the associated reflected-pulse energy or peak amplitude. Transit-time and pulse amplitude information for all pixels is read out preferably between laser pulses.

In an alternative embodiment, the array of detectors and their associated processing-electronics unit cells are distributed throughout an integrated circuit. While this has the disadvantage of providing a smaller proportion of surface area to collect photons, it can be produced much more economically since the two chips do not need to be mated.

A core principle of any pulsed lidar system is to measure the time between when a pulse is emitted and when a reflected pulse is received. Light travels at the speed of light, $c_m$, for the medium in which it travels. Thus for a target which is d meters away, the round trip time is $t=2d/c_m$. In air this is roughly 6.7 psec/mm, so the fundamental problem in a millimeter resolution pulsed lidar is to measure time to an accuracy of a few picoseconds. Some techniques have been successful in making millimeter measurements in a single pixel system, but for a variety of reasons there have been difficulties in applying them to a sensor array. While numerous efforts have been made to measure time intervals in a focal plane array to millimeter accuracy, so far all have fallen short of this goal.

Figure 5:
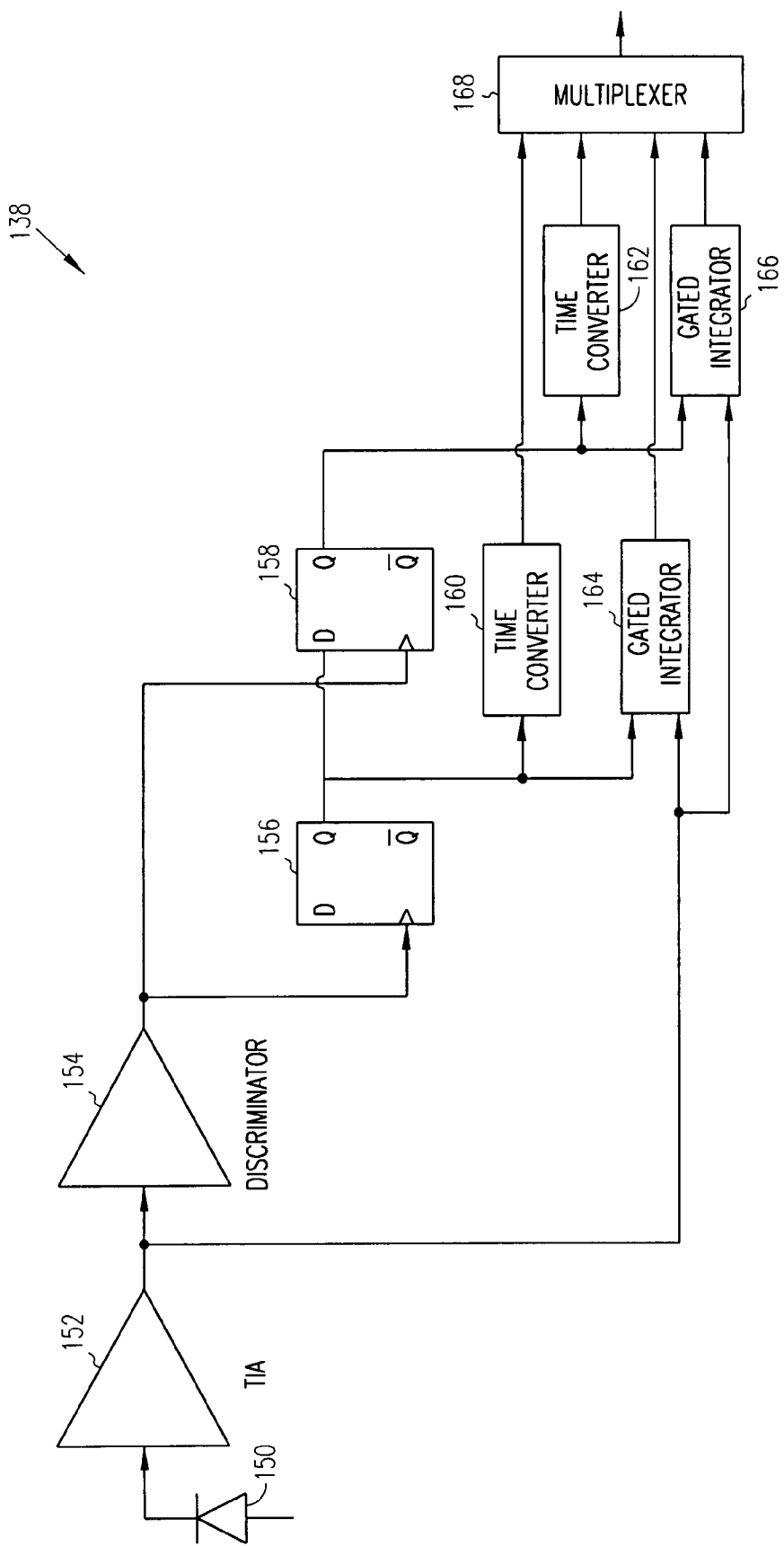
FIG. 5 illustrates a detector and a timing circuit according to the present invention.

A timing circuit 138 can be used in system 100 of FIGS. 1-4 is shown in FIG. 5. The returning light is detected by detector 150 and converted to an electrical signal. The signal is amplified by transimpedance amplifier (TIA) 152, and then converted into a signal appropriate to trigger a flip-flop by discriminator 154. The output of flip-flop 156 goes high when a first pulse is detected, and the output of flip-flop 158 goes high only when a second pulse is detected. The time of arrival of the two pulses is converted to a digital signal by time converters 160 and 162 and read out through multiplexer 168.

In one embodiment, timing circuit 138 includes gated integrators 164 and 166. The amplitude of the two pulses is determined by integrating the signal from slightly before the pulse starts until shortly after the pulse ends. In an alternative implementation that is easier to implement, a peak detector can be employed rather than a gated integrator. While simpler to implement, this is likely to provide poorer performance as the peak of a pulse is not a good monotonic indicator of pulse energy, particularly when the detector is operating in a non-linear region.

The measurement of pulse intensity is critical in making accurate range measurements when the associated timing measurements are made between times at which the pulses exceed a threshold and the required precision is significantly smaller than the pulse rise time. When the pulse returning from a target is larger, the threshold is exceeded sooner, and this leads to an apparently shorter distance (ranging error). An accurate measure of pulse intensity, such as provided by a gated integrator, provides an effective means of compensating for this apparent error in range measurement. In an alternative embodiment, a peak detector can be used to estimate pulse intensity; however this provides much less accurate range compensation—particularly when the detector is operating in saturation.

In a single pixel lidar implementation, the gated integrator can be triggered in advance of the arrival of the received pulse by the introduction of a delay line of a few nanoseconds. However, in an array implementation, the introduction of such a delay line at each pixel would be prohibitive.

In one embodiment, such as is shown in FIG. 5, a pair of gated integrator blocks 164 and 166 are used for each of the start and stop pulses. In one such embodiment, each gated integrator block includes a pair of gated integrators which are ping-ponged to find the intensity of each of these pulses. In one such embodiment, each gated integrator can be integrated over a time that is at least as long as the longest pulse that will be observed. When the return pulse is detected, the alternation between integrators is stopped, and the last integrated pulse is utilized to compensate the range measurement. In one embodiment, reflected pulses are 1-20 ns in length when they reach detector 136. In such an embodiment, one could design gated integrators 164 and 166 to integrate over 20 ns, with an overlap of 10 ns.

A method of determining the transit time for an optical pulse will be described next. The simplest approach to measuring time interval between two pulses is to enable a counter when the first pulse arrives, stop the counter when the second pulse arrives, and record the number of counts. The number of counts times the clock period will be the time. The basic problem with this is that in order to have a resolution of 1 mm, the clock frequency would have to be approximately 200 GHz. This is neither economic nor practical for a large array of sensors.

Figure 6:
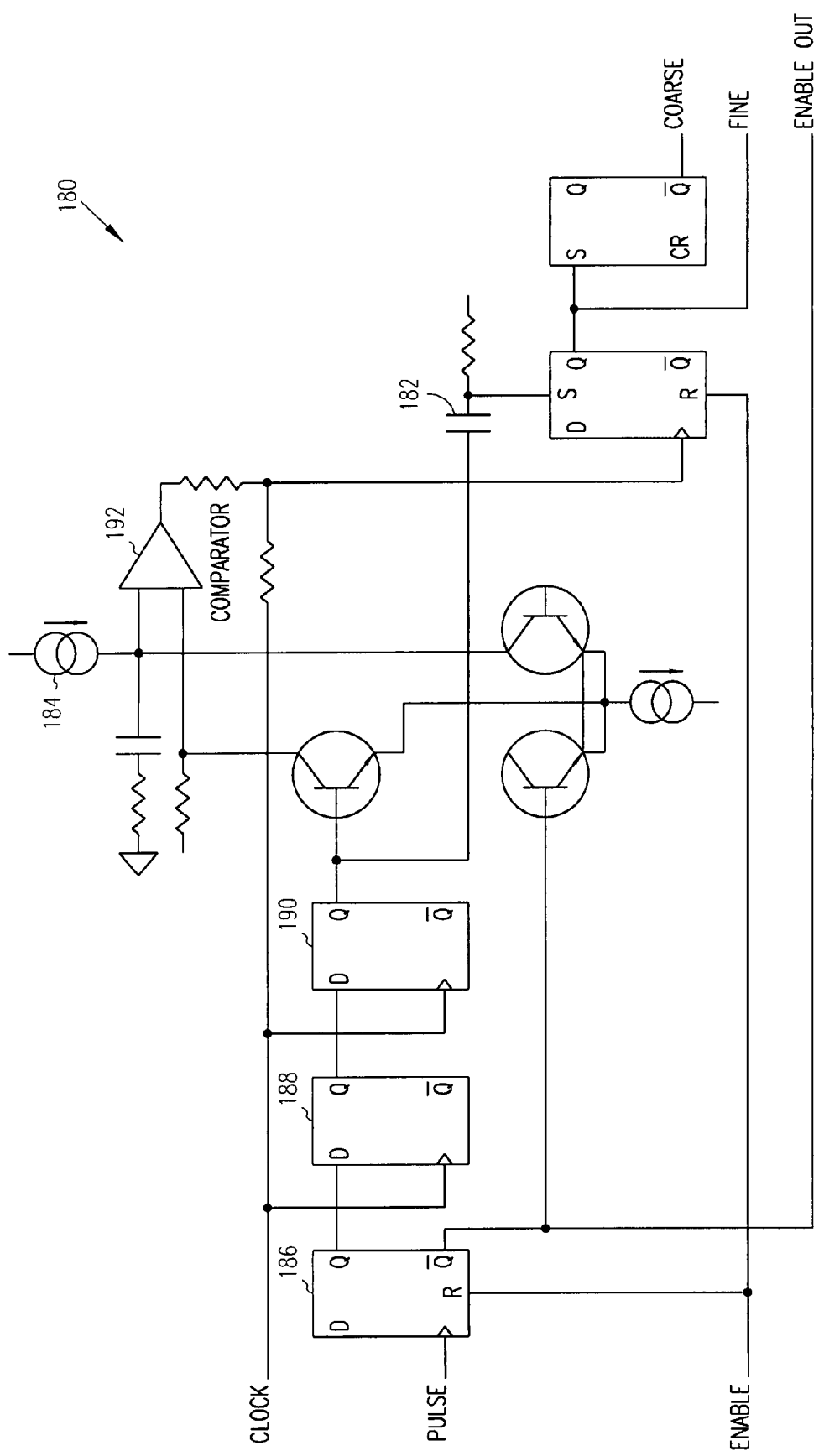
FIG. 6 illustrates an interpolator which can be used in the timing circuit of FIG. 5.
Figure 7:
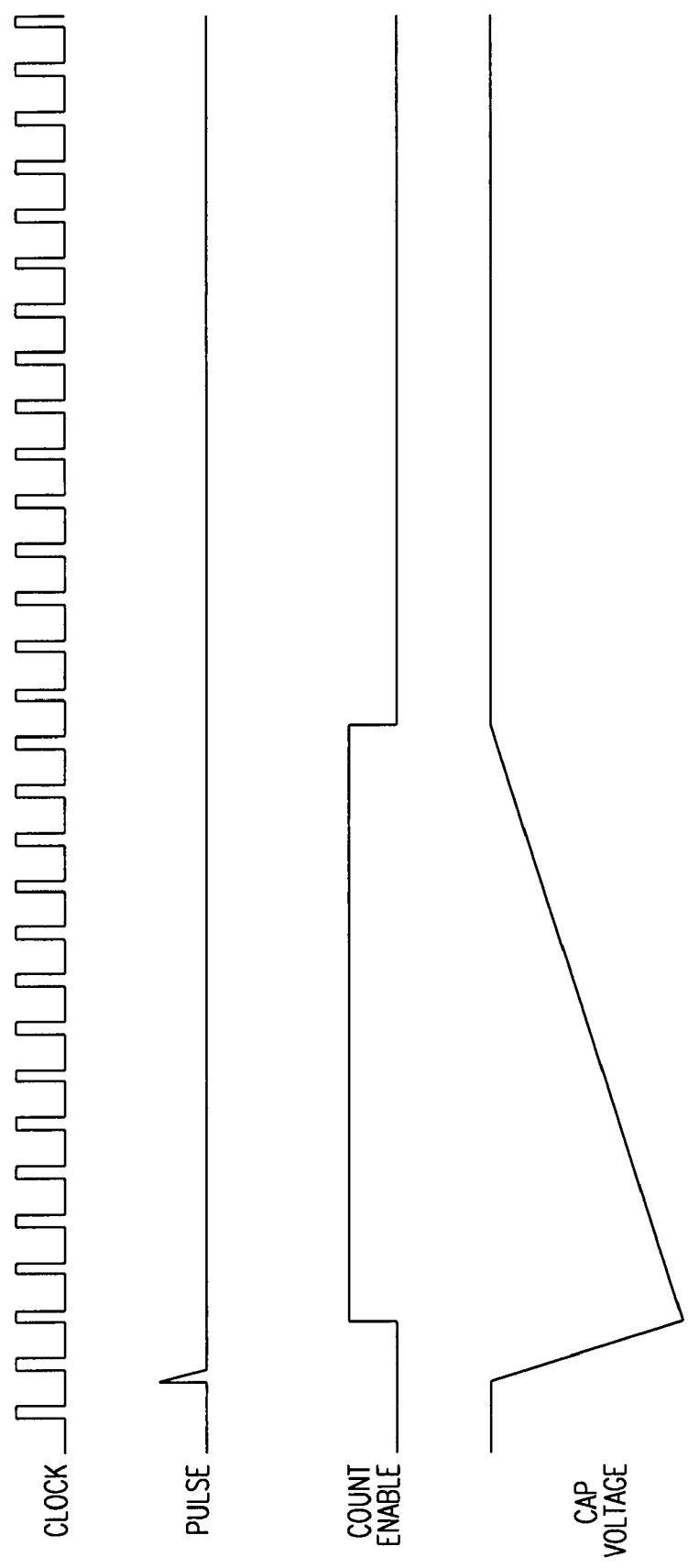
FIG. 7 illustrates Nutt interpolation within the timing circuit of FIG. 5.

Timing circuit 138 stretches the time interval two or more times, so that a more modest clock frequency can be utilized to achieve the required accuracy. In one embodiment, each time converter 160 and 162 includes at least one interpolator. An interpolator measures the time between an asynchronous event and a subsequent master clock pulse. In one embodiment, each interpolator includes an interpolator circuit 180 which charges a capacitor at a different rate than it discharges. An example interpolator circuit 180 is shown in FIG. 6. An example timing diagram is shown in FIG. 7

The fundamental concept of this interpolator is to create a linear charging ramp on a capacitor when the first pulse arrives, begin discharging this capacitor at a different rate after a fixed number of master clock pulses, and enable a counter on the master clock pulses until the capacitor arrives at its original state. Implementations of this process have been previously called Nutt interpolators.

In operation, timing circuit 138 counts the number of clock pulses of the master clock that occur between the arrival of the first pulse and the arrival of the second pulse. In addition, an interpolator is applied to each pulse to measure the time between the two pulses to an accuracy many times that of the master clock. If the time from the first pulse to a subsequent master clock pulse is $T_A$, the time from the second pulse to a subsequent master clock pulse is $T_B$, and the time between these two selected clock pulses is $T_C$, then the time total time between the two pulses will be $T=T_A+T_C-T_B$. $T_C$ will be accurately measured in integer numbers of master clock pulses. The time intervals $T_A$ and $T_B$ can be estimated by a pair of interpolators that effectively stretch the time by a potentially large factor, enabling accurate measurement by counting with the same master clock.

As illustrated in FIG. 6, before a triggering event (such as a pulse) arrives, integrating capacitor 182 is held at a high level by upper current source 184. When enabled, flip-flop 186 waits for a pulse and the coarse counter is enabled. When a pulse arrives, flip-flop 186 is clocked, and that in turn causes integrating capacitor 180 to be discharged by a lower current source 185 at a high rate, and the fine counter is enabled. When the transition of flip-flop 188 propagates through the synchronizing flip-flops 188 and 190, integrating capacitor 182 is then charged again by upper current source 184. When the output of comparator 192 shows that the integrating capacitor has returned to its original level, the fine counter is disabled.

Figure 8:
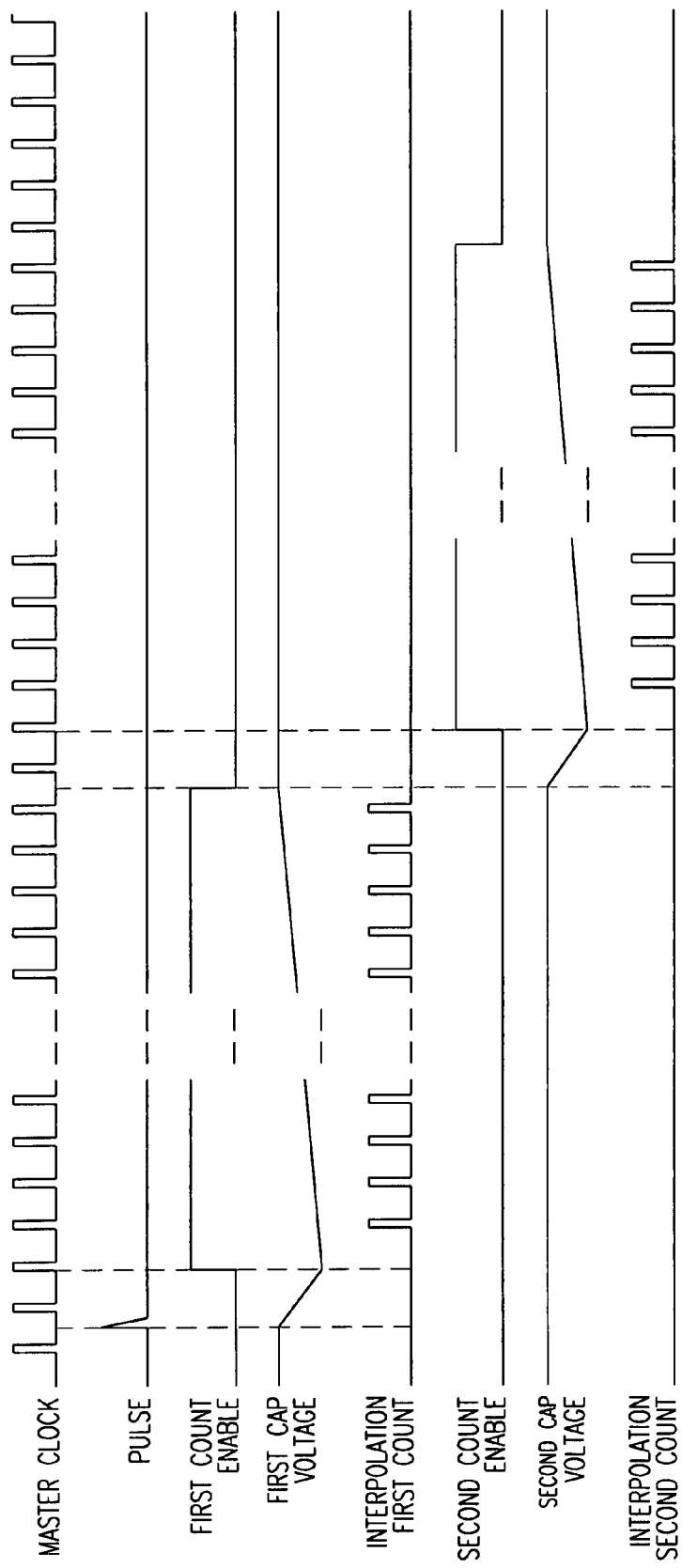
FIG. 8 illustrates the cascade of two interpolator circuits within the timing circuit of FIG. 5.

In one interpolator embodiment, two or more separate interpolator circuits 180 are cascaded, with the discharge of one triggered when the previous capacitor has returned to a threshold value. An example timing diagram for an interpolator having two interpolator circuits 180 is shown in FIG. 8.

In one such embodiment, an interpolator includes five or six cascaded interpolator circuits 180; the discharge of one interpolator circuit 180 is triggered when the previous capacitor has returned to a threshold value. In one five interpolator circuit embodiment, the clock operates at 100 Mhz and the rate of charging for each capacitor is 8-16 (corresponding to 3 or 4 bits) times the rate of discharging. If the rate of charging is 8 times that of discharging, such an embodiment leads to a total interpolation of 8^5 or 32,768 times the rate of discharging. Interpolation capacitors may, for instance, be on the order of 8-20 fF, with the charging/discharging currents about 200-800 nA.

The value of the intensity measurement, whether it corresponds to a peak detection or a gated integrator, can be either digitized at the pixel and multiplexed as a digital value or it can be multiplexed as an analog voltage to an off-chip analog-to-digital converter. Nearly identical circuitry will suffice to digitize the intensity as was used to measure the interpolated voltage—a counter will determine how long it takes to reduce the stored voltage to an original value.

Figure 9:
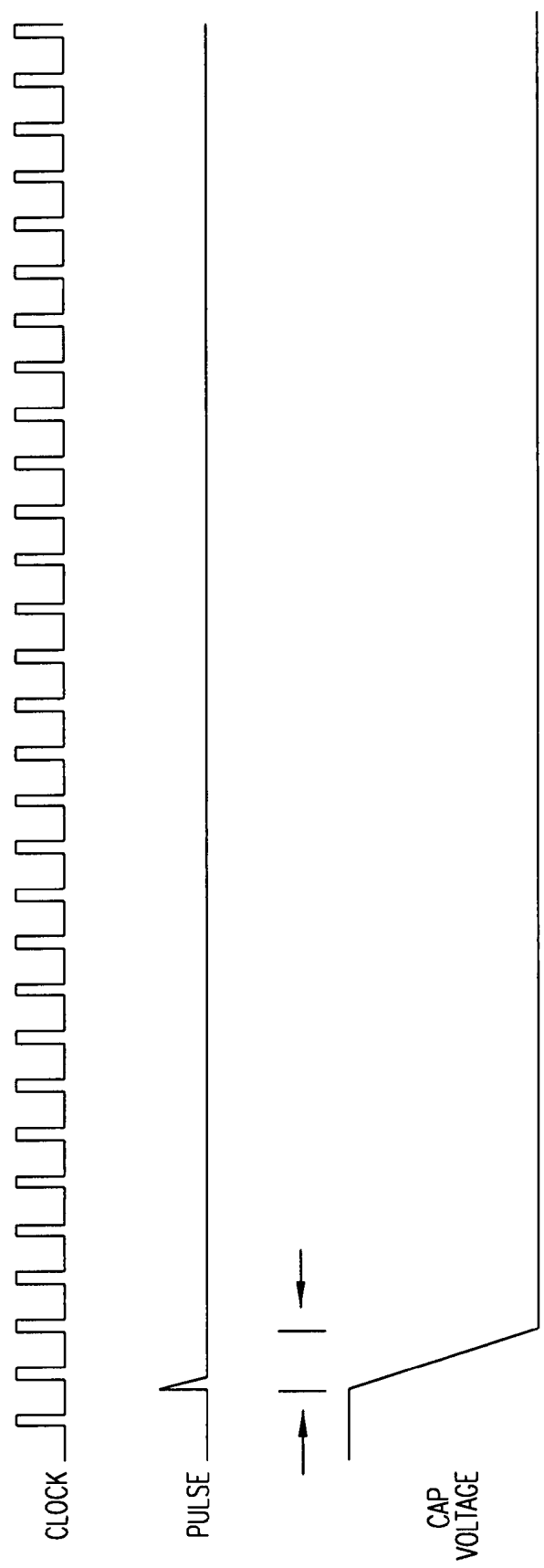
FIG. 9 illustrates time interpolation based on analog voltage readings.

An alternative approach is to provide a single slope measurement of the timing interpolation, saving the voltage on the interpolator until after all the pixel measurements are performed. At that point the interpolated value can be multiplexed off the chip with an analog multiplexer, rather than a digital multiplexer as provided in the dual slope implementation. These values would then be converted by an off-chip analog-to-digital converter. An example timing diagram for such an approach is shown in FIG. 9.

When a pulse is detected, a capacitor will be charged at a fixed rate until a subsequent transition of the master clock. The value of the voltage on the capacitor will be proportional to the time between the pulse and this clock edge. The multiplexer, in this case, will transmit an analog voltage off chip.

In the case of a single slope timing interpolator, it is preferable to use an analog multiplexer to transfer both the interpolator and intensity measurements off-chip.

As noted above, system 100 also may include a resonator/attenuator 114 used to calibrate system 100. One impediment to making highly accurate measurements with an individual pixel is the variation of circuit properties that can occur during operation, including variations of laser pulse properties, environmental conditions and aging. Additionally, within an array individual pixels may behave differently, and the variation of their behavior may not track with environmental conditions or time. Also, when the detectors operate in saturation, the intensity measurement may not be linear. Consequently it is important to incorporate components which can allow the system to compensate for these behaviors across the array.

In one embodiment, a fiber resonator/attenuator is added to characterize the properties of individual pixels and their variation as a function of pulse properties, environmental conditions, and aging; and the variation of behavior within the array. The principle function of this assembly is to provide a known range of signals to the receiver, essentially simulating the circumstances the receiver would experience when presented with a test object but within the confines of the instrument. When in calibration mode, the instrument will be presented with a sequence of pulses from the resonator/attenuator 114, and measured results from this will be subsequently used to adjust the measurements taken from real objects.

Figure 10:
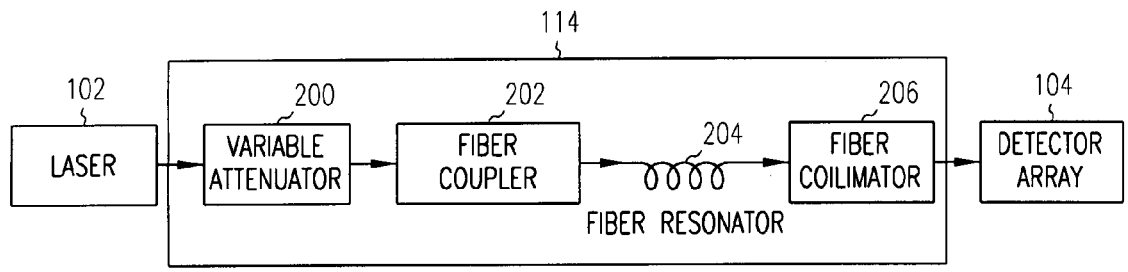
FIGS. 10-12 illustrates resonator/attenuators according to the present invention.

The mechanical construction of resonator/attenuator 114 can be as shown in FIG. 10. Resonator/attenuator 114 includes a variable attenuator 200, a fiber coupler 202, a fiber resonator 204 and a fiber collimator 206. A small sample of pulse from laser 102 is passed through a variable attenuator 200 on its way to the fiber coupler 202. The attenuator 200 permits simulating a wide range of return signal amplitudes, and determining their effect on the apparent round trip time delay. It can also be set to prevent the laser pulses from reaching detector array 104 through this path; in that case the only energy reaching the detector array is from a remote object being measured.

Figure 11:
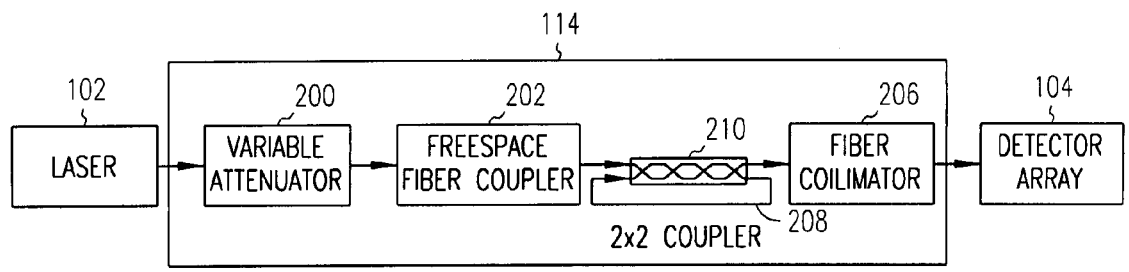

In one embodiment, fiber resonator 204 is assembled using an optical fiber 208 and a 2×2 coupler 210, as shown in FIG. 11. Optical fiber 208 can be a multimode fiber if the bandwidth of the laser pulse is small enough, but it will need to be a single mode fiber if the bandwidth of the fiber is large enough to cause significant dispersion over the desired fiber length compared to the required timing precision.

Coupler 210 distributes the incoming pulse between the two output ports, with any convenient distribution. As an example, a pulse delivered to the input of a 50-50 coupler would send half the power to each output port, so half the power would be delivered to the detector array, and the other half would be delivered to the input of the coupler, with a delay proportional to the length of the connecting fiber. This would continuously repeat, delivering a sequence of pulses to fiber collimator 206. Fiber collimator 204 couples the emerging laser pulse onto detector array 104.

It is preferable for the emerging pulse to arrive at every pixel in the detector array simultaneously, but it is acceptable if the time variation across the array is geometrically deterministic and repeatable.

Figure 12:
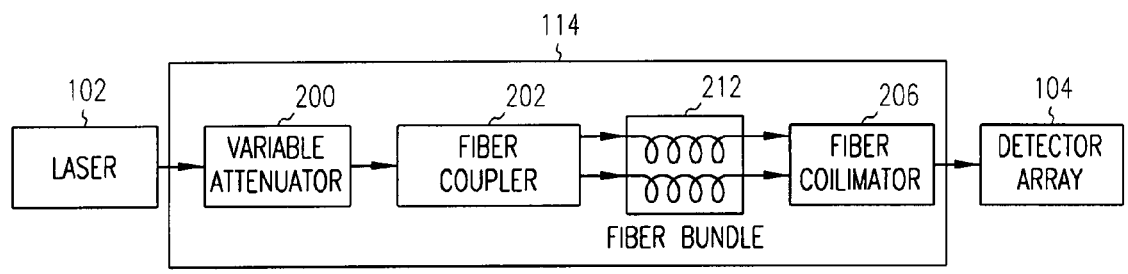

In an alternative embodiment, a bundle 212 with multiple fibers is used to simulate multiple time delays. These can be selected with a set of ranges approximately the same as experienced by the detector when the system is operated to acquire data. Such an approach is shown in FIG. 12.

Finally, in a third embodiment, the fiber resonator is either a single mode or multimode fiber with the ends coated so that they are partially reflective. This approach has two significant disadvantages over the other approaches: 1) the first pulse arrives faster than subsequent pulses that have to traverse the fiber twice; and 2) the reflective coating on the input facet will attenuate all the pulses, and will be reflected back towards laser 102.

The number and spacing of the pulses coming from resonator/attenuator 114 will depend on the particular architecture for the resonator. However, the spacing will be highly stable at a particular temperature of the fiber. The effective fiber length, corresponding to the spacing between these pulses, can be characterized as a function of temperature. Alternatively, a fiber whose propagation is nearly independent of temperature can be utilized, though this is can be more difficult and expensive to produce.

In use, the calibrator compensates for the apparent ranges of objects measured in the field. At the time of system construction, timing circuit 106 or 138 will be used to measure the apparent ranges of the pulses coming from resonator/attenuator 114. These values are recorded. One can assume that the fibers in the resonator/attenuator 114 will not change length or refractive index over time. Then, when a new object is measured, the measured ranges of the object will be altered depending on the apparent ranges from the calibration. For instance, if the calibrator measurements suggest that time intervals are all being measured 0.5% longer, then the same amount will be added to the measurements for the real object.

The calibrator can also be used to determine variations in measured range due to variations in return intensity. Since the spacing of the pulses from the calibrator is independent of intensity, the attenuation can be varied and both pulse intensity measurements and time interval measurements can be recorded. This can be used to produce a table of measured intensity vs. measured time. This table can then be used as a correction to measurements taken from real objects, so that objects of differing intensity but the same range will appear to have the same range as long as the environmental conditions of the sensor remain unchanged. When the environment does change, a new table of corrections must be acquired. This procedure adds significantly to the system resolution and accuracy The use of a partially coated single mode fiber to calibrate a scanning single-detector lidar system has been described (see, e.g., U.S. Pat. No. 6,246,468). However, when a narrow frequency laser is used, a multimode fiber provides sufficient accuracy, leading to a much more economical and manufacturable component.

In the case that the laser pulse rise time is comparable to the desired precision, range walk compensation will not be necessary, and the pulse intensity measurement will not be needed. When the receiving detector array is operated in non-linear Geiger mode as in Marino above, a single received photon can cause a state transition in the receiver. In this case, the measurement of received pulse intensity can only be determined on a statistical basis. However, if the pulse is large enough to have a high likelihood of being detected, then it is most likely that the received photon appears in the rise time of the laser. Thus, if the laser pulse rise time is comparable to the desired precision, no pulse intensity measurement will be needed to compensate for any apparent range walk. So to achieve 5 mm resolution, a laser pulse with a rise time shorter than 35 psec will be adequate to ensure that no range walk correction will be required.

When the array is used to measure the inside of a sphere that is centered at the camera, all the pixels should report the same range. Further, this should true for any size sphere. However, variations in timing offset and scale will cause the measurements to deviate from this idealization. A table of offsets and corrections for each pixel can be developed, and typically this can be accomplished with any known surface at more than one range. Typically, a flat surface would be measured at two or more ranges, and the measured results would then be applied to all the pixels in subsequent measurements.

If, however, the correction table is created in the factory, the corrections are unlikely to remain constant over time and temperature to millimeter accuracy, principally because of variations in component parameters with temperature or aging. The procedure would have to be applied periodically. However, the procedure cannot be conveniently applied in the field, as suitable flat surfaces are unlikely to be conveniently available. Even if suitable fixtures were available, it would be unknown when or how often they should be applied. Further, the system operator would be required to execute a special procedure, and his future results would be dependent on how well the procedure was followed.

The resonator array imposes the same pulse delay pattern across the detector array every time since the geometry of the components will be unchanged. A single factory calibration of the apparent differences across the array can be supplemented with the apparent differences at the moment the array uniformity is being field evaluated, and the sum of these corrections can be applied to every pixel when applied to real objects.

While timing interpolators are designed to provide an accurate, linear measure of the elapsed time between asynchronous events and system clock pulses, real circuits can only provide an approximation. The difference can become exceedingly important when attempting to make measurements with picosecond precision, and also when the interpolation ratios are large.

The nonlinearity at each pixel can be determined quite accurately if the pulse arrival times are not coherent with the system clock. In that case, the likelihood of making a measurement resulting in one of the potential interpolated values will be proportional to the likelihood of the associated pulse arriving in the associated time slot allocated to that value. So if the time T between clock periods is divided into M time slots with end points $t_0, \ldots, t_M$, a large number of time measurements over all the pixels will result in a distribution $\{n_k; k=1 \ldots M\}$ of time measurements with resulting interpolated values in these time slots; that is, on each occasion we see an interpolated value t with $t_{i-1} < t < t_i$, we increment $n_i$. If the interpolator was truly linear, then this distribution would be uniform; to the extent it is not uniform, a linearization of future measurements can be expected to delivery superior accuracy. If the total number of measurements is $$N = \sum_k n_k,$$

then an approximate measure of the proportion of measurements landing in the $k^{th}$ time slot is $n_k/N$. There are a few similar and reasonable ways to correct future measurements on the basis of these observations, but a sensible (and successful) approach is to assign each new interpolated value the time associated with the center of the time slot during which it occurs. Accordingly, a sensible set of approximate correction factors can be estimated as $$t_k^c = \frac{T}{N}\left(\sum_{i<k} n_i + \frac{n_k}{2}\right).$$

When future timing measurements are made, and an interpolation between system clock values lies between $t_{k-1}$ and $t_k$, the value $t_k^c$ will be used in its place.

Slope compensation will be discussed next. When the surfaces being measured are not normal to the laser radar, additional calculations must be made to enhance the system accuracy. For instance, if the outgoing laser beam is 5 mm in diameter at the target object, but hits a surface which is inclined at 60 degrees from the normal, the pulse return will be distributed over an area which has almost a 9 mm extent in range. Therefore the return pulse could be as long as 58 psec, even if the outgoing pulse is instantaneous. In general, the calculated range will be somewhere within the observed return spot. If the desired range is that of the center of the spot, as would normally be the case, the surface normal must be known to adjust the range walk for the increase in pulse width—otherwise the range walk correction will be smaller than necessary by approximately the amount the pulse has been elongated.

A two step process is applied to obtain enhanced range information on inclined surfaces While the ranges to inclined surfaces will be underestimated, the normal to these surfaces will be well approximated if adjacent samples are on the same region. Therefore, a good approximation of the surface normal can be obtained uncorrected data. Then, in a second step, the range to the center of the laser spot can be determined by increasing the first range estimate in accordance with this normal estimate.

Oversampling will be discussed next. In some cases it may be possible to enhance the spatial resolution of a range image after the data has been acquired, as well as the associated intensity image. This is true for both a range image acquired by a lidar array as well as one which has been acquired by a laser scanner that has been intentionally over-sampled. The algorithm for range image enhancement is similar to ones that have been used in digital photography.

Let o(x,y) represent the range distribution associated with an object, and let r(x,y) represent the range distribution associated with a blurred image of that object. We assume that the blur the image has been subjected to is a linear, space-invariant transformation, describable by a known space-invariant point-spread function s(x,y).

Then the object and the image are related by:

$$r(x,y) = \int\int o(\xi,\eta) s(x-\xi, y-\eta) d\xi d\eta$$

We seek to obtain an estimate ô(x,y) of o(x,y), based on the measured range image r(x,y) and the known point-spread function s(x,y).

Using the relationship between object and image in the frequency domain, $$F\{r(x,y)\} = F\{s(x,y) \otimes o(x,y)\} = S(f_X, f_Y) O(f_X, f_Y)$$

an estimate of the spectrum of the original object can be obtained by simply multiplying the image spectrum by a restoration filter H, $$\hat{O}(f_X, f_Y) = H(f_X, f_Y) R(f_X, f_Y),$$

where the restoration filter H, is given by $H(f_X, f_Y) = S^{-1}(f_X, f_Y)$.

An improvement of this estimate can be achieved by assuming the image is embedded in noise, and is represented by:

$$r(x,y) = o(x,y) \otimes s(x,y) + n(x,y)$$

Where n(x,y) is the noise associated with the detection process. If the power spectral densities of the object and the noise are represented by $\Phi_o(f_X, f_Y)$ and $\Phi_n(f_X, f_Y)$, then the transfer function of the optimum restoration filter is given by:

$$H(f_X, f_Y) = \frac{S^*(f_X, f_Y)}{|S(f_X, f_Y)|^2 + \frac{\Phi_n(f_X, f_Y)}{\Phi_o(f_X, f_Y)}}$$

The present invention provides a device for three dimensional imaging of objects using a single laser pulse. It overcomes the problems of prior systems in providing millimeter accuracy and resolution. The device comprises a pulsed light source, means for projecting the light towards the object, optics for collecting the reflected light, sensors for detecting the reflected light, conditioning for analog signals produced by the sensors, processors for recording intensity and timing data from the sensors, and a computer and software for converting the sensor data to a highly accurate three dimensional image. An array of optics and electromechanical devices are operated in concert with an algorithm to calibrate the system in situ to provide highly accurate measurements.

In the above discussion, the term "computer" and "processor" are defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The invention claimed is:

1. A method of imaging an object, comprising:
mounting an array of detectors in an image plane;
connecting each detector in the array of detectors to a timing circuit having one or more interpolators, wherein each interpolator includes one or more interpolator circuits, wherein each interpolator circuit charges a capacitor at a different rate than it discharges;
transmitting an optical pulse toward an object so that a portion of the optical pulse is reflected from the object as a reflected pulse, wherein transmitting the optical pulse includes recording a first value, wherein the first value is representative of when the optical pulse was transmitted toward the object;

detecting arrival of the reflected pulse at one or more detectors within the array of detectors, wherein detecting arrival of the reflected pulse includes:

determining a reflected pulse characteristic representative of the reflected pulse's amplitude; and recording a second value, wherein the second value is representative of when the reflected pulse arrived at the detector; and measuring range to the object as a function of the first and second values and the reflected pulse characteristic.

2. The method according to claim 1, wherein determining a reflected pulse characteristic includes integrating the reflected pulse over a predetermined interval of time.

3. The method according to claim 1, wherein determining a reflected pulse characteristic includes detecting peak amplitude.

4. The method according to claim 1, wherein recording a second value includes monitoring the detector to detect when the reflected pulse passes through a threshold, recording a detection time corresponding to when the reflected pulse passed through the threshold and correcting the detection time as a function of the reflected pulse characteristic.

5. The method according to claim 1, wherein two or more interpolator circuits are cascaded and wherein recording a second value includes initiating a first interpolator circuit on arrival of the reflected pulse at the detector and initiating a second interpolator circuit after the first interpolator circuit reaches a predetermined voltage.

6. The method according to claim 1, wherein transmitting an optical pulse includes directing a portion of the optical pulse to a detector and wherein recording a first value includes detecting arrival of the portion of the optical pulse at the detector.

7. The method according to claim 1, wherein transmitting an optical pulse includes connecting a resonator/attenuator to the array of detectors and directing the optical pulse into the resonator/attenuator such that the resonator/attenuator transmits two or more optical pulses to the array of detectors.

8. The method according to claim 1, wherein recording a second value includes initiating one of the interpolator circuits on arrival of the reflected pulse at the detector and capturing a circuit voltage representative of charge across the first capacitor on a subsequent clock edge.

9. The method according to claim 8, wherein initiating one of the interpolator circuits includes discharging the interpolator circuit's capacitor at a first rate until a subsequent transition of the master clock.

10. The method according to claim 8, wherein initiating one of the interpolator circuits includes:

discharging the interpolator circuit's capacitor at a first rate until a subsequent transition of the master clock; and capturing voltage across the interpolator circuit's capacitor.

11. A system for rendering a three-dimensional image of an object, comprising:

a laser, wherein the laser generates an optical pulse and projects the optical pulse on an object so that it is reflected as a reflected pulse;

a detector array, wherein the detector array includes a plurality of detectors, wherein the detectors are oriented to receive the reflected pulse;

a timing circuit connected to the detector array, wherein the timing circuit determines when the reflected pulse reached a detector on the detector array, wherein the timing circuit includes one or more interpolators, wherein each interpolator includes one or more interpolator circuits, wherein each interpolator circuit charges a capacitor at a different rate than it discharges the capacitor; and a processor connected to the timing circuit, wherein the processor calculates transit time for the optical pulse as time between when the optical pulse was projected on the object and when a pulse reflected from the object reached detectors on the detector array in order to determine range to the object.

12. The system according to claim 11, wherein each interpolator circuit includes:

a timing capacitor which can be set to a predetermined initial state;

means for charging said capacitor at a first predetermined rate when a pulse is detected; and means for discharging said capacitor at a second predetermined rate until said capacitor returns to its initial state.

13. The system according to claim 11, wherein the timing circuit includes means for storing a value representative of a peak of the reflected pulse.

14. The system according to claim 11, wherein the timing circuit includes means for storing a value representative of integration of the reflected pulse.

15. The system according to claim 11, wherein the detector array further includes means for coupling a resonator/attenuator between the laser and the detector array.

16. A device for imaging one or more three dimensional objects, including:

a pulsed light source;

means for transmitting light toward said objects;

optics for collecting light during the time for light to transit from said pulsed light source, reflect from said objects, be collected and focused by said optics one or more detectors, wherein the detectors are oriented for receiving the collected light and converting the collected light into an electrical signal;

timing means, connected to the one or more detectors, for determining a transit time for a pulse to leave the pulsed light source, reflect off the objects and return to one or more of the plurality of deflectors, wherein the timing means includes one or more interpolators, wherein each interpolator includes a circuit which charges at a different rate than it discharges; and calibration means, connected between the light transmitting means and the detectors, wherein the calibration means includes a resonator.

17. The device according to claim 16, wherein the resonator includes a coupler connected to an optical fiber.

18. The device according to claim 16, wherein the light source is a laser.

19. The device according to claim 18, wherein the detectors are avalanche photodiodes operating in non-linear Geiger mode.

20. The device according to claim 18, wherein pulse duration is less than 100 psec.

* * * * *

UNITED STATES PATENT AND TRADEMARK OFFICE
CERTIFICATE OF CORRECTION

| | | |
|---|---|---|
| PATENT NO. | : 7,453,553 B2 | Page 1 of 1 |
| APPLICATION NO. | : 11/691256 | |
| DATED | : November 18, 2008 | |
| INVENTOR(S) | : Dimsdale | |

It is certified that error appears in the above-identified patent and that said Letters Patent is hereby corrected as shown below:

In column 8, line 32, delete "$\{n_k; k-1...M\}$" and insert -- $\{n_k; k=1...M\}$ --, therefor.

Signed and Sealed this

Twenty-eighth Day of April, 2009

JOHN DOLL
*Acting Director of the United States Patent and Trademark Office*